United States Patent [19]
Patel et al.

[11] Patent Number: 5,918,247
[45] Date of Patent: Jun. 29, 1999

[54] METHOD FOR CANCELING PARTIAL LINE FETCH FOR CACHE WHEN NEW DATA IS REQUESTED DURING CURRENT FETCH AND INVALIDATING PORTION OF PREVIOUSLY FETCHED DATA

[75] Inventors: Sanjay Patel; Donald L. Tietjen; Frank C. Galloway, all of Austin, Tex.

[73] Assignee: Motorola, Inc., Schaumburg, Ill.

[21] Appl. No.: 08/958,738

[22] Filed: Oct. 27, 1997

Related U.S. Application Data

[63] Continuation of application No. 08/549,500, Oct. 27, 1995, abandoned.

[51] Int. Cl.⁶ .................................................. G06F 12/04
[52] U.S. Cl. ............................ 711/138; 711/137; 712/207
[58] Field of Search ...................................... 395/381, 383; 711/137, 138; 712/207, 205

[56] References Cited

U.S. PATENT DOCUMENTS

| | | | |
|---|---|---|---|
| 4,729,093 | 3/1988 | Mothersole et al. | 364/200 |
| 4,742,454 | 5/1988 | Robinson et al. | 395/250 |
| 4,763,253 | 8/1988 | Bluhm et al. | 364/200 |
| 5,113,522 | 5/1992 | Dinwiddie, Jr. et al. | 395/553 |
| 5,367,660 | 11/1994 | Gat et al. | 711/3 |
| 5,544,342 | 8/1996 | Dean | 395/446 |
| 5,553,276 | 9/1996 | Dean | 395/555 |
| 5,586,295 | 12/1996 | Tran | 395/464 |
| 5,717,895 | 2/1998 | Leedom et al. | 395/467 |

OTHER PUBLICATIONS

IBM; TDB (A protocol for processing concurrent misses) p. 611, Dec. 1993.
IBM; TDB (Design for improved cache performance via overlapping of cache miss sequences) pp.5962–5966, Apr. 1983.

Primary Examiner—Meng-Ai T. An
Assistant Examiner—Gautam R. Patel
Attorney, Agent, or Firm—Susan C. Hill; Keith E. Witek

[57] ABSTRACT

When a processor (102) issues a request for an address (502), a determination is made as to whether or not the address is contained within a buffer (103) or cache associated with the processor (102), or the address is contained within a line of data currently being fetched from an external memory system (105). If the address is not contained within the buffer or cache and is not contained within a line being currently fetched, the current fetch will be cancelled (515, 516).

24 Claims, 5 Drawing Sheets

METHOD FOR CANCELING PARTIAL LINE FETCH FOR CACHE WHEN NEW DATA IS REQUESTED DURING CURRENT FETCH AND INVALIDATING PORTION OF PREVIOUSLY FETCHED DATA

This application is a continuation of prior U.S. patent application Ser. No. 08/549,500 filed Oct. 27, 1995, now abandoned.

FIELD OF THE INVENTION

The present invention relates in general to data processing systems, and in particular, to a system and method for cancelling a line fetch for an instruction buffer or cache.

BACKGROUND OF THE INVENTION

In order to increase the speed of processing within a microprocessor (also referred to herein as a CPU (central processing unit)), designers are implementing buffers and/or caches within the microprocessor chip (integrated circuit) in order to compensate for the speed differential between main memory access time and processor logic. Processor logic is generally faster than main memory access time with the result that processing speed is mostly limited by the speed of main memory. A technique used to compensate for the mismatch in operating speeds is to employ an extremely fast, small memory between the CPU and main memory whose access time is close to processor logic propagation delays. This small memory is used to store segments of programs currently being executed in the CPU and/or temporary data frequently needed in the present calculations. By making programs (instructions) and data available at a rapid rate, it is possible to increase the performance of the processor.

Analysis of a large number of typical programs has shown that the references to memory at any given interval of time tend to be confined within a few localized areas in memory. This phenomenon is sometimes referred to as the property of "locality of reference." The reason for this property may be understood considering that a typical computer program flows in a straightline fashion with program loops and subroutine calls encountered frequently. When a program loop is executed, the CPU repeatedly refers to the set of instructions in memory that constitute the loop. Every time a given subroutine is called, its set of instructions are fetched from memory. Thus, loops and subroutines tend to localize the reference to memory for fetching instructions.

If the active portions of the program and/or data are placed in a fast small memory, the average memory access time can be reduced, thus reducing the total execution time of the program. Such a fast small memory may be a cache memory or a buffer. Such a cache or buffer memory has an access time that is less than the access time of main memory, often by a factor of 5 to 10.

The fundamental idea of such a cache or buffer organization is that by keeping the most frequently accessed instructions and/or data in this fast cache or buffer, the average memory access time will approach the access time of the cache or buffer.

The basic operation of such a cache or buffer is as follows. When the CPU needs to access an instruction or data, the cache or buffer is examined. If the instruction or data word is found in the cache or buffer, it is read by the CPU. If the word addressed by the CPU is not found in the cache or buffer, the main memory is accessed to read the word. A block of words containing the one just accessed is then transferred from main memory to the cache or buffer memory. In this manner, some data is transferred to the cache or buffer so that future references to memory find the required words in the cache or buffer.

The average memory access time of the computer system can be improved considerably by the use of the cache or buffer. The performance of cache or buffer memory is frequently measured in terms of a quantity called "hit ratio." When the C1PU refers to memory and finds the word in the cache or buffer, it is said to produce a "hit." If the word is not found in the cache or buffer, it counts as a "miss." If the hit ratio is high enough so that most of the time the CPU accesses the cache or buffer instead of main memory, the average access time is closer to the access time of the cache or buffer memory. For example, a computer with a cache or buffer access time of 100 nanoseconds, a main memory access time of 1,000 nanoseconds, and a hit ratio of 0.9 produces an average access time of 200 nanoseconds. This is a considerable improvement over a similar computer with a cache or buffer memory whose access time is 1,000 nanoseconds.

One of the problems associated with the foregoing technology occurs during the fetching of the additional data associated with the word accessed by the CPU. It is possible that during the fetch of the remaining portion of the block of data the CPU will issue a request for an instruction or data having an address that is not contained within the block of data being fetched. With prior art implementations, the CPU must wait until the block of data has been completely fetched into the cache or buffer memory. This delays the provision of the instruction or data pertaining to the requested address to the CPU for several cycles.

Thus, there is a need in the art for a system and method for improving the speed and efficiency of the fetching process within a data processing system.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENT

Figure 1:
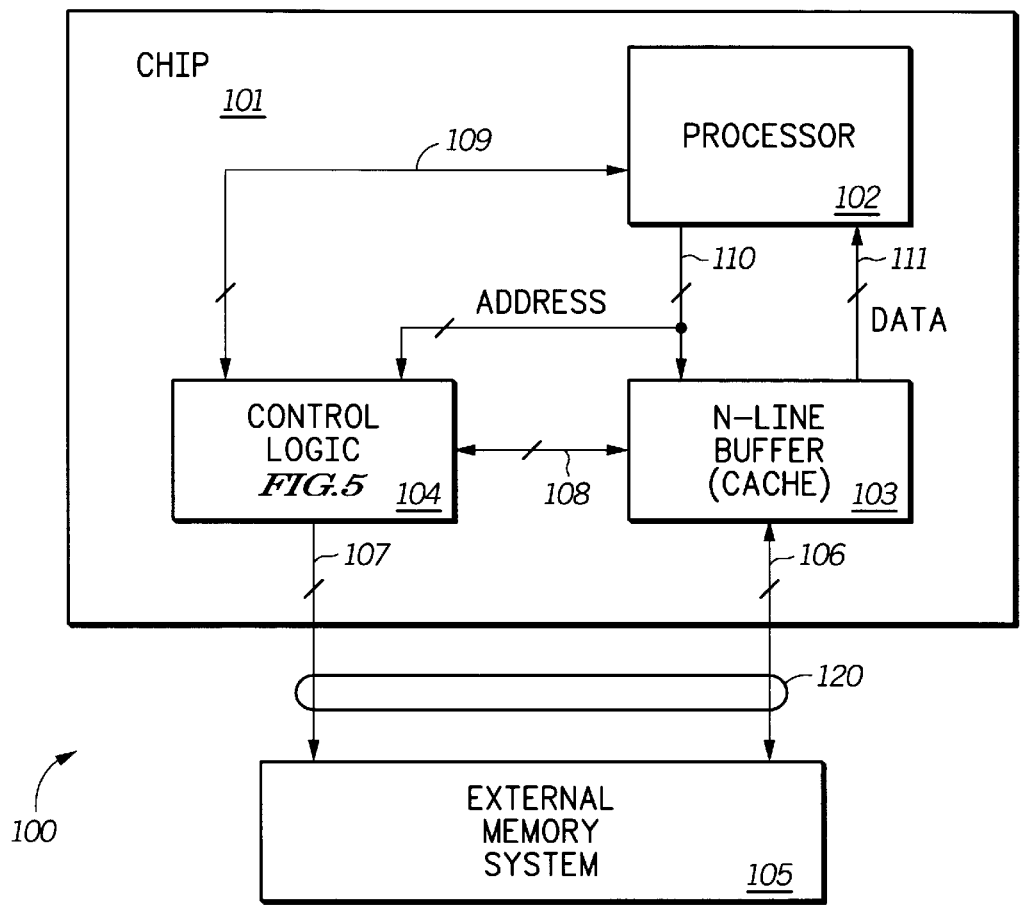
FIG. 1 illustrates a portion of a data processing system configured in accordance with one embodiment of the present invention.

In the following description, numerous specific details are set forth such as specific word or byte lengths, etc. to provide a thorough understanding of the present invention. However, it will be obvious to those skilled in the art that the present invention may be practiced without such specific details. In other instances, wellknown circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring to FIG. 1, there is illustrated system 100 including chip (integrated circuit) 101 coupled by bus 120 to external memory system 105. Memory system 105 may comprise any well-known memory device, such as RAM, ROM, disk storage devices, or permanent storage devices.

Chip 101 includes processor 102, which may comprise a typical microprocessor or central processing unit ("CPU"). Coupled to processor 102 is N-line buffer 103 (N is a positive integer). Buffer 103 may be an instruction-fetch ("I-fetch") buffer or a data buffer or a unified cache. Please note that within the following description program instructions and data are often referred to separately, but that both program instructions and data may both be generally referred to as "data." Furthermore, for purposes of the scope of the following description, buffer 103 may be substituted for by a cache memory. Such a cache memory may be an N-way set associative cache.

Buffer 103 in the following description is four lines deep, each line being 128 bits wide, divided into four 32-bit sections, each with a valid bit. This is further described below with respect to FIG. 2. Each 32-bit section within a line is also referred to herein as a long word. Note, this four line deep I-fetch buffer cart be generalized to an I-fetch buffer of any depth or to a cache memory.

If a cache memory is substituted for buffer 103, such a cache memory may be a primary cache memory embedded within chip 101, or a secondary cache memory external to chip 101. Furthermore, buffer 103 may be located anywhere along the path between processor 102 and external memory system 105 including being embedded within memory system 105.

Buffer 103 receives address information from processor 102 along bus 110 and transmits instructions and/or data information along bus 111 to processor 102.

Figure 3:
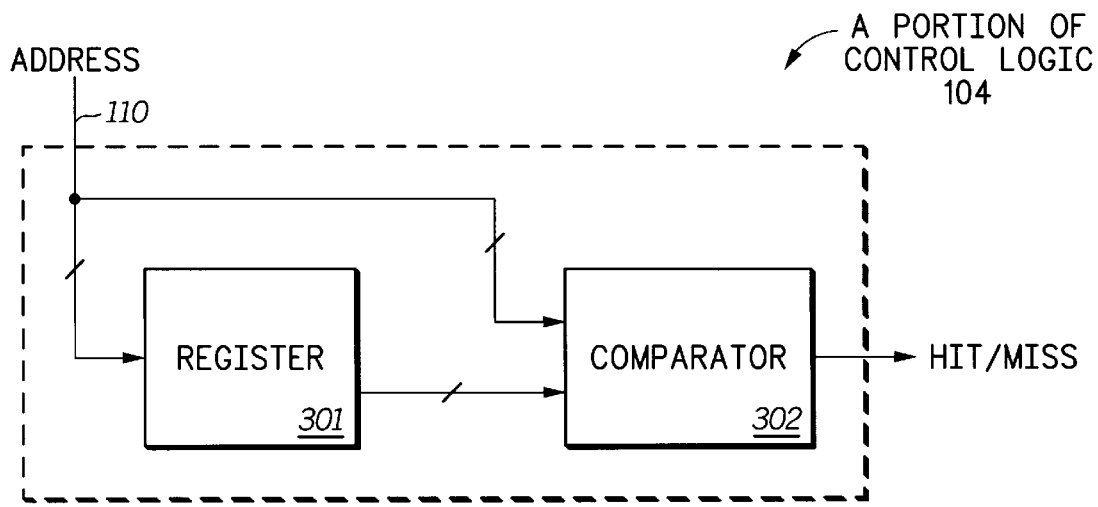
FIG. 3 illustrates a portion of the control logic illustrated in FIG. 1 in accordance with one embodiment of the present invention.
Figure 5:
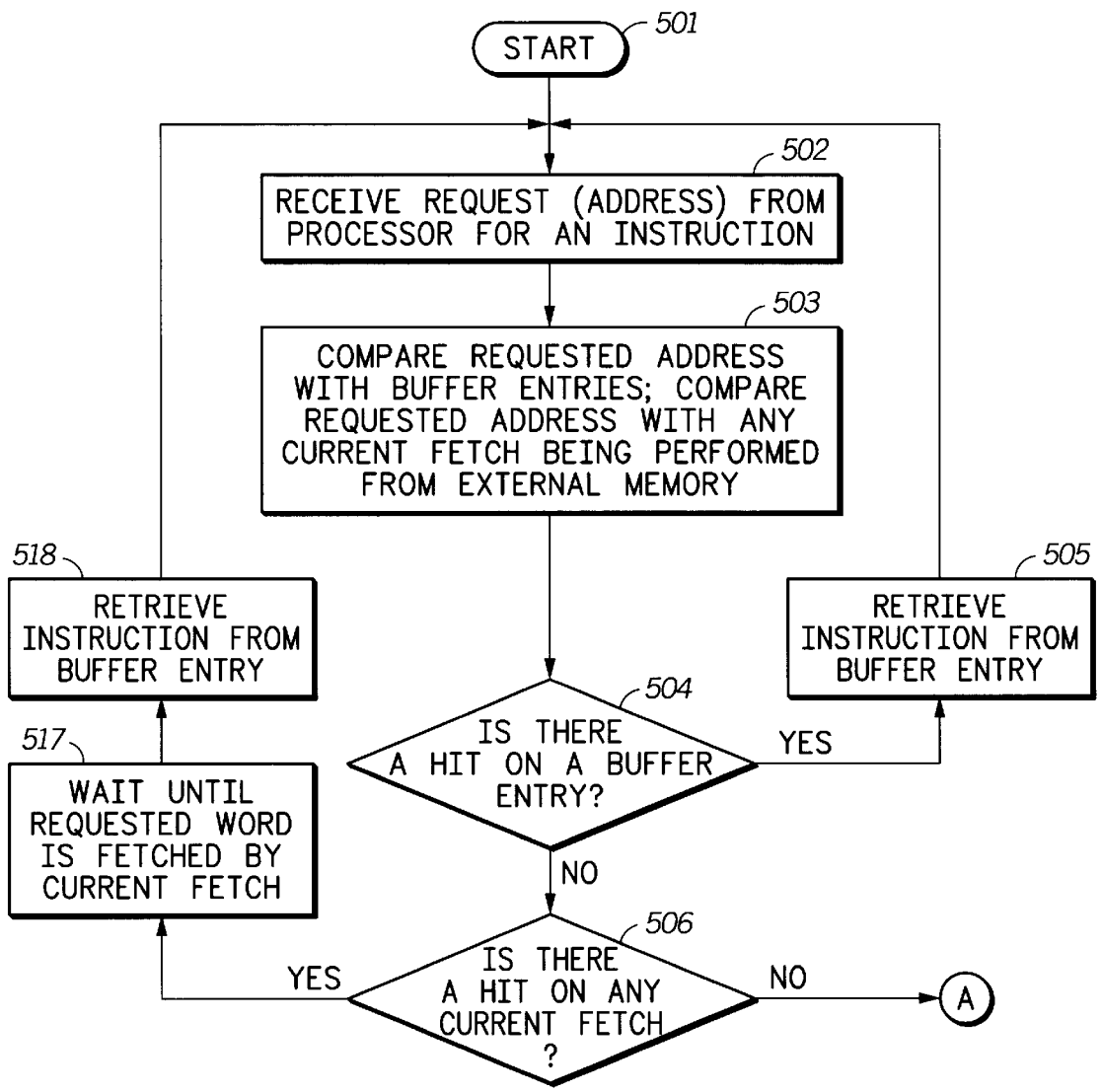
FIGS. 5 and 6 illustrate a flow diagram in accordance with one embodiment of the present invention.
Figure 6:
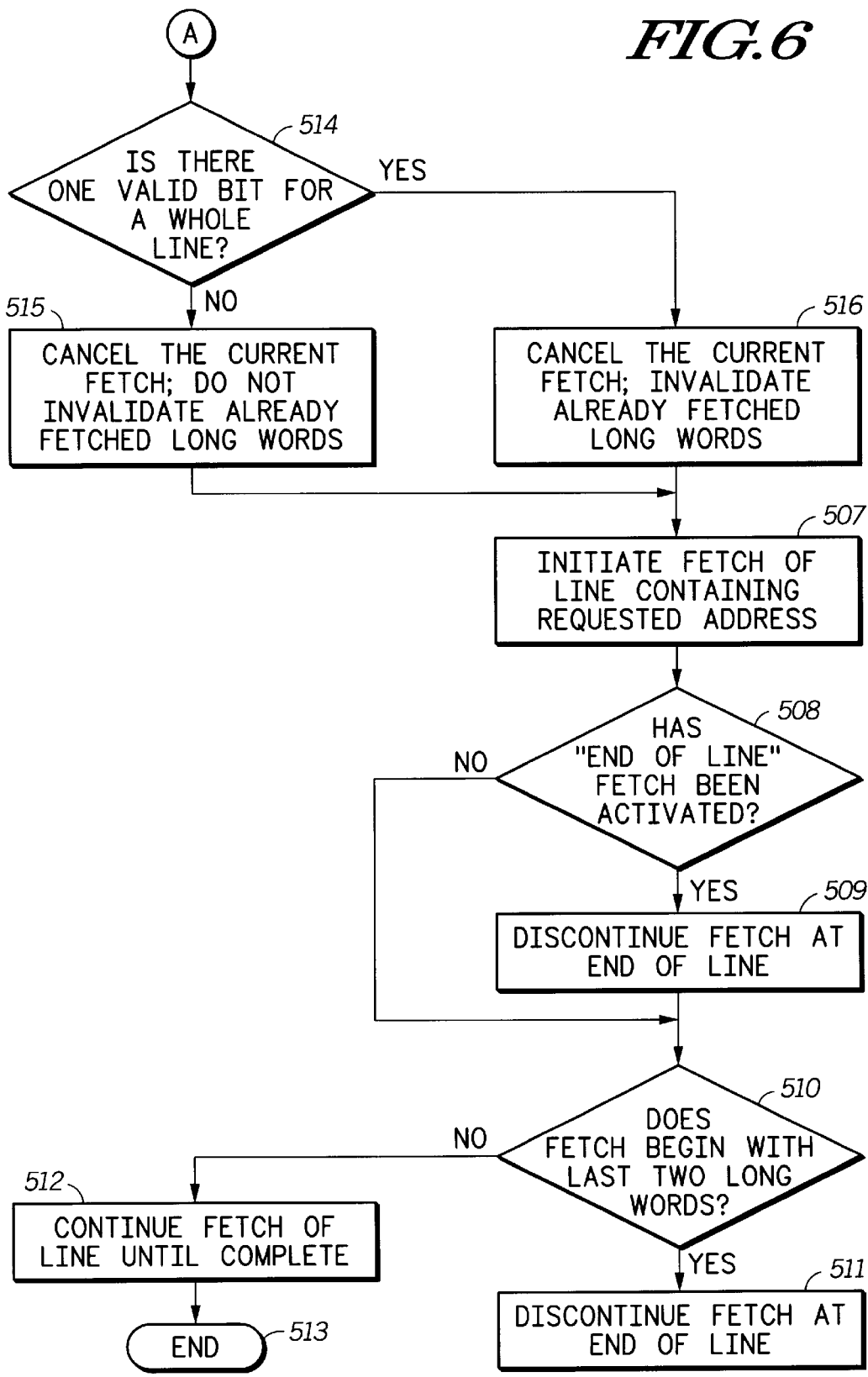

Chip 101 also includes control logic circuitry 104, which includes circuitry as illustrated in FIG. 3 and logic circuitry for implementing the process illustrated in the flow diagram of FIGS. 5 and 6. Control logic 104 communicates with processor 102 by bus 109, receives the same address information sent on bus 110 from processor 102 to buffer 103, is coupled to buffer 103 by bus 108, and is coupled to external memory system 105 by bus 107, which may be part of bus 120. Control logic circuitry 104, like buffer 103, may be located external to chip 101.

As will be further described below, processor 102 will issue requests for data by issuing an address along bus 110 that is received by buffer 103. Buffer 103 will determine whether or not the requested data resides within buffer 103, and will return the requested data along bus 111 to processor 102 should buffer 103 contain the requested data.

If the requested data does not reside within buffer 103, then a request for that data will be passed on to memory system 105 along bus 120 in addition to a fetch being issued for the line containing the requested data. These requests will be sent to memory system 105, which will return the requested word and associated line of data to buffer 103 and processor 102.

The present invention describes the fetching of one line of instructions and/or data; however, the present invention may be implemented to fetch blocks of instructions and/or data of greater or lesser length.

Figure 2:
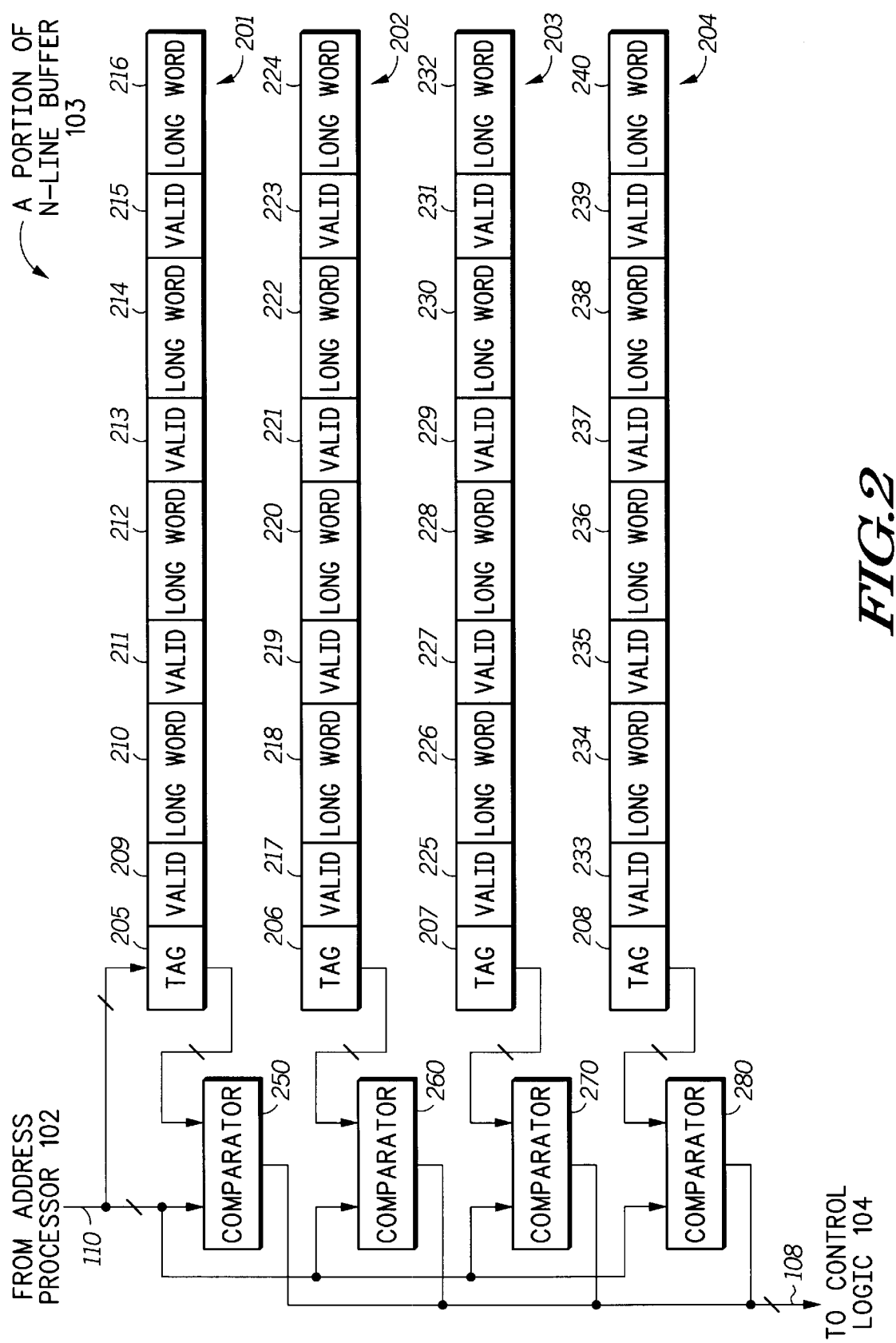
FIG. 2 illustrates a portion of the N-line buffer illustrated in FIG. 1 in accordance with one embodiment of the present invention.

Referring next to FIG. 2, there is illustrated a portion of buffer 103 having four lines 201–204. Line 201 includes tag 205, lo valid bits 209, 211, 213 and 215, and long words 210, 212, 214 and 216. Similarly, line 202 includes tag 206, valid bits 217, 219, 221 and 223, and long words 218, 220, 222 and 224. Similarly, line 203 includes tag 207, valid bits 225, 227, 229 and 231, and long words 226, 228, 230 and 232. And, similarly, line 204 includes tag 208, valid bits 233, 235, 237 and 239, and long words 234, 236, 238 and 240.

Note, in one embodiment of the present invention, as described above, a valid bit is provided for each long word within a line. In an alternative embodiment of the present invention, only one valid bit is provided for a whole line.

The circuitry illustrated in FIG. 2 receives address information from processor 102 on bus 110, which is provided to comparator circuits 250, 260, 270, and 280. Comparator 250 is associated with line 201, comparator 260 is associated with line 202, comparator 270 is associated with line 203, and comparator 280 is associated with line 204.

In one embodiment, tags 205–208 each include the address for their respective lines 201–204 minus the lower four bits, which are not used.

Comparator 250, upon receipt of the address from processor 102 will compare this address with the address for line 201 contained within tag 205. Comparators 260, 270, and 280 perform similar operations with respect to tags 206–208, respectively. The results of these comparisons are exited from comparators 250, 260, 270 and 280 and are provided along bus 108 to control logic 104.

FIG. 2 further illustrates that when an address is received from processor 102 on bus 110, it is received by tag 205. This illustrates that the requested address is stored within a line tag in buffer 103 when there is a miss on that address resulting in a fetch of that line from external memory system 105.

Buffer 103 has limited storage capacity. This implies that long words not used in the immediate future by processor 102 may not be in buffer 103 when a relevant address access occurs, as those long words will be dismissed (overwritten) because of prior accesses. Thus, a line fetch cancellation procedure provides for an improvement in utilization of buffer 103.

Referring next to FIGS. 5 and 6, there is illustrated a process in accordance with the present invention. This process will also be described with respect to FIGS. 1–4.

The process begins at step 501 and proceeds to step 502 where a request for an instruction (i.e., an address) is received from processor 102 along bus 110. Note, the following discussion will be with respect to the implementation of buffer 103 as an I-fetch buffer for fetching and storing instructions. However, the present invention may also be utilized for the fetching and storing of data other than instructions.

Thereafter, in step 503, this address is compared using comparators 250, 260, 270 and 280 with buffer entries, as described above with respect to FIG. 2. Furthermore, the requested address is compared with an address of a line that may be currently being fetched from memory system 105 (hereinafter referred to also as a current fetch). In other words, when the request of step 502 was received by control logic 104 and buffer 103, a fetch based on a previously received address may already have been initiated by control logic 104 and may still be occurring.

Referring to FIG. 3, there is illustrated a portion of control logic 104 illustrating the receipt of the requested address along bus 110 by both register 301 and comparator 302. Register 301 will contain the address of a current fetch. Comparator 302 compares the address in register 301 with the address of the current request from processor 102 and produces a hit signal if there is a match between the address of the current fetch and the address of the request from processor 102, and produces a miss signal if there is not a match. This hit/miss signal is further utilized within control logic 104, as described below.

Returning to FIGS. 5 and 6, in step 504, a determination is made whether or not there is a hit on any of the buffer entries. In other words, if the address received from processor 102 along bus 110 matches any of the addresses located in tags 205–208, a hit signal will be transmitted from the associated comparator in buffer 103 for transmission along bus 108 to control logic 104.

If a hit is received from any of comparators 250, 260, 270, 280, the process proceeds to step 505 wherein the instruction is retrieved from the buffer entry in which it is contained and is sent to processor 102 along bus 111. For example, if the received address matches the address contained within tag 206, comparator 260 will issue a hit signal along bus 108. This will be received by control logic 104, which will instruct buffer 103 (for example, by control lines on bus 108) to send the requested word from line 202 to processor 102.

If in step 504 there is not a hit on any of buffer entries 201–204, the process proceeds to step 506 to determine whether or not there is a hit on a current fetch as indicated by the hit/miss signal issued by comparator 302.

If there is a match between the address of the current fetch and the address of the processor request, then the process proceeds to step 517.

In step 517, the process will wait until the requested word is fetched during the current fetch from memory 105 to buffer 103. Thereafter, in step 518, the desired instruction will be retrieved from buffer 103 to processor 102. As an alternative to step 518, or in addition to step 518, the requested word can be directly fetched to processor 102. The process then returns to step 502.

Returning to step 506, if there is not a hit on any current fetch being performed, the process proceeds to step 514 for a determination of whether or not buffer 103 is implemented to include one valid bit for a whole line, as opposed to valid bits being implemented for each long word within a line. If one valid bit is implemented for each line, then the process proceeds to step 516, whereby control logic 104 cancels the current fetch being performed and the entire line being fetched is invalidated (i.e., any long words already retrieved into one of lines 201–204 are invalidated).

However, if a valid bit is implemented for each long word within a line, the process proceeds instead to step 515, whereby control logic 104 cancels the current fetch being performed, but does not invalidate any long words that have already been retrieved into buffer 103.

After either step 515 or step 516, the process proceeds to step 507 to initiate a fetch of the line containing the requested address.

In step 507, control logic 104 will initiate a fetch of the line containing the requested address. In step 508, a determination is made whether or not there has been an activation through typical programming means for an "end of line" fetch. Generally, a fetch of a line from memory system 105 will be performed in a wrap-around manner, whereby the entire line associated with the requested address will be retrieved from external memory system 105 regardless of where the requested address is contained within that line. In other words, if the requested address is located towards the end of a line, the fetch will retrieve the words to the end of that line and then will proceed to fetch the remaining words of that line beginning at the front end of the line. However, the present invention in one embodiment may be implemented to fetch words in a line beginning with the requested address and ending at the end of that line. This is shown by step 509. To implement this "end of line" fetch, valid bits associated with each long word of a line will be implemented. As each long word is fetched from external memory system 105 to buffer 103, the associated valid bit for that long word will be set.

Regardless of the outcome of decision block 508, the process eventually proceeds to step 510 for a determination of whether or not the fetch begins with the last M (M is a positive integer) long words of a line. In the present example and in one embodiment, M is equal to two. If yes, the process proceeds to step 511 to discontinue the fetch at the end of that line. However, if the fetch does not begin with the last two long words of the line, the process proceeds to step 512 to continue the fetch of the line in a wrap-around manner until the whole line has been fetched and retrieved into buffer 103. The process will then end at step 513.

Note, various different procedures could be used for replacing existing lines within buffer 103 with newly fetched lines. For example, a round-robin fetch procedure could be used whereby the replacement of lines 201–204 is performed in a sequential and cyclical manner. Alternatively, replacement of lines in buffer 103 could be performed in a least recently used ("LRU") manner.

Figure 4:
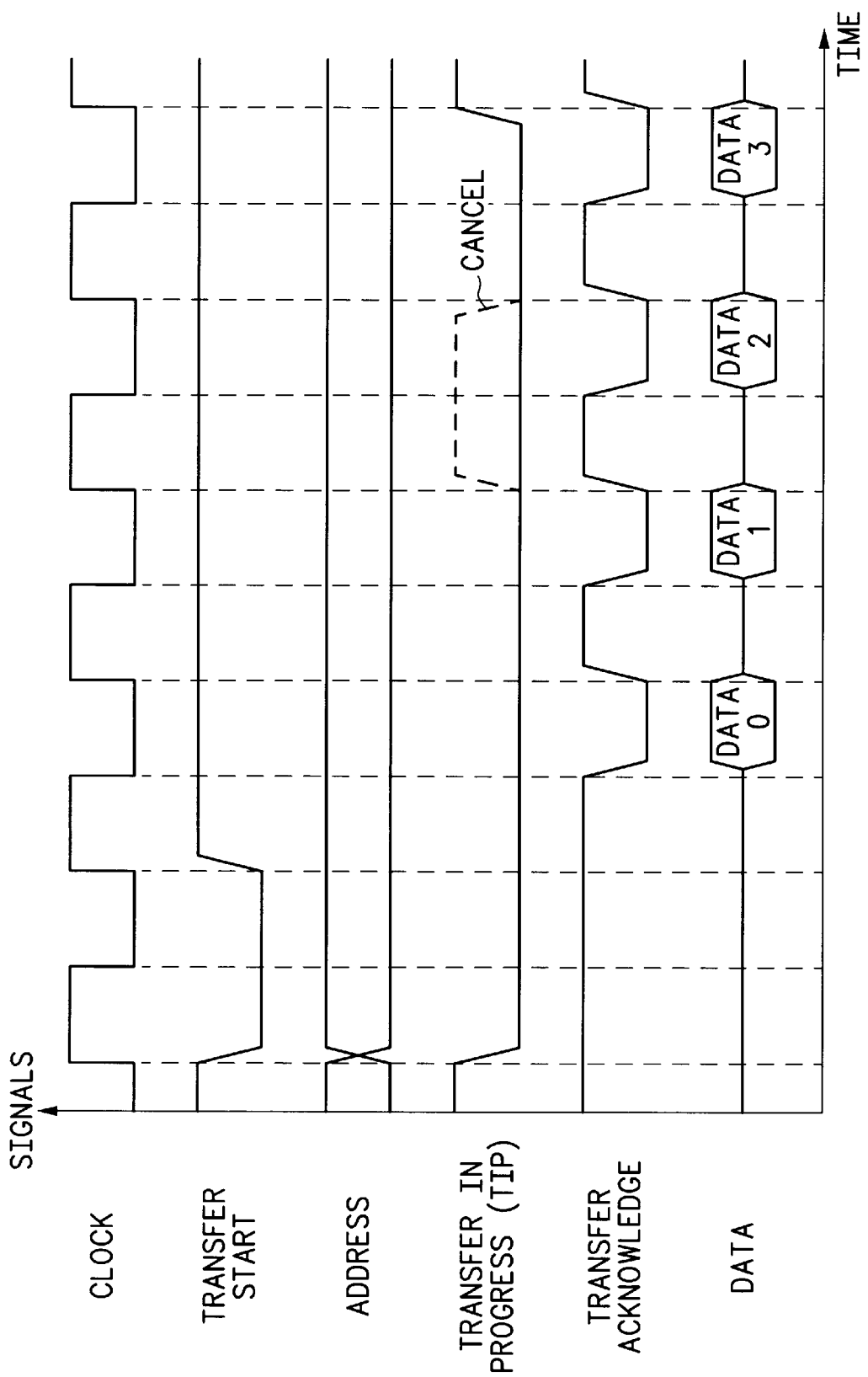
FIG. 4 illustrates a timing diagram illustrating a timing of operations in accordance with one embodiment of the present invention.

Referring next to FIG. 4, there is illustrated a timing diagram showing how the cancellation of the current fetch noted in steps 515 and 516 is performed by control logic 104.

The first line of the timing diagram shows the clock signal. The next line of the timing diagram shows the transfer start signal, which is sent by control logic 104 on bus 107 to memory system 105 to begin the transfer process for retrieving a line from external memory system 105 to buffer 103. Generally, upon initiation of the transfer start signal, the address associated with the line to be fetched is also sent along bus 120 to external memory system 105, which utilizes this address to perform a direct memory access operation in order to retrieve the line for transmission along bus 120 to buffer 103. Also at that time, the transfer in progress ("TIP") signal goes low. This signal is also provided on bus 120. As data, or long words, are received from external memory system 105, a transfer acknowledge (ACK) signal is sent from external memory system 105 acknowledging transfer of the data.

As described above, if there is not a hit with respect to a requested address on any of comparators 250, 260, 270, 280, or 302, control logic 104 will then cancel any current fetch being performed (steps 515 and 516). Essentially, this cancellation is a negation of the TIP signal, as indicated by the dashed line in FIG. 4. When external memory system 105 receives this cancellation signal, it will stop driving the data from memory system 105 to buffer 103. In this example, the transfer acknowledge signal will be asserted at this time and DATA2 and DATA3 will not be fetched.

With one valid bit implemented for each line, the cancellation will invalidate the whole fetched line (step 516). With a valid bit per long word, the cancellation will not invalidate already fetched long words (step 515). This is illustrated in FIG. 4 where DATA0, and possibly even DATA1, have already been driven from external memory system 105 to buffer 103. If a valid bit is associated with both of these long words, then an invalidation of these already fetched long words will not be performed within buffer 103.

Note, a typical memory system, such as memory system 105, implementing a direct memory access (DMA) device, will be able to implement the present invention through acceptance of the cancellation signal, i.e., the negation of the TIP signal.

Further, the action of cancelling a line fetch is extendable to internal memory and may even be more effective in internal memory as internal memory can be custom designed to incorporate a memory reinitialization feature.

As described above, the present invention allows for half-line (64-bit) fetches by issuing a line fetch and cancelling after the first two long words are received. Thus, the present invention allows for fetches on line, half-line, and long word boundaries.

Although the present invention and its advantages have been described in detail, it should be understood that various changes, substitutions and alterations can be made herein without departing from the spirit and scope of the invention as defined by the appended claims.

We claim:

1. A method comprising the steps of:

beginning a current fetch of a block of data between a cache and a memory, the cache being coupled to a processor, the memory being configured to store information in lines of data wherein each line of data has a beginning and an end;

receiving a request for new data from the processor wherein the new data is not found within the cache but is located in a specific line of data within the memory;

canceling the current fetch for the block of data in response to receipt of said request, a portion of the block of data having at least one associated validity indicator which is stored within the cache;

invalidating the at least one associated validity indicator of any portion of said block of data which was previously fetched during the current fetch to invalidate any data in the cache which was fetched during the current fetch; and reading the new data from the memory in one of two manners which is selected by the processor: (1) a first manner requiring that the cache read and store all of the data in the specific line of data that contains the new data; and (2) a second manner being where the cache stores only a portion of the specific line of data from memory wherein the portion of the specific line of data starts at the location of the new data in the specific line of data and terminates at the end of the specific line of data wherein the performance of either (1) or (2) is determined by a position of the new data within the specific line of data and wherein the processor performs some accesses using (1) and other accesses using (2).

2. The method as recited in claim 1, wherein said request includes the address of the new data requested, and wherein said canceling step further comprises the steps of:

comparing at least a portion of said address to address tags of data blocks residing in the cache; and comparing said address to an address of said block of data associated with said current fetch, wherein said current fetch of said block of data is canceled when said address of said data requested:

(1) does not match any of said addresses of said data blocks residing in said buffer; and (2) does not match said address of said block of data associated with said current fetch.

3. The method as recited in claim 2, wherein said memory is located externally from a chip containing said processor and said cache.

4. The method as recited in claim 2, wherein said canceling step comprises the step of:

notifying said memory to discontinue sending any remaining portions of said block of data from memory.

5. The method as recited in claim 4, wherein said notifying step includes the step of negating a transfer in progress (TIP) signal on a bus coupling said processor to said memory.

6. The method as recited in claim 2, further comprising the step of:

invalidating portions of said block of data fetched to said cache wherein the each portion of the portions of said block of data are associated with separate valid bits in the cache.

7. The method as recited in claim 2, further comprising the step of:

invalidating portions of said block of data already fetched to said cache by writing to a plurality of valid bits within the cache.

8. The method as recited in claim 2, further comprising the step of:

fetching only two longwords of data from a block of data from said memory associated with said address of said new data requested.

9. The method as recited in claim 8, wherein said block of data comprises a line of data words, wherein said method further comprises the step of:

discontinuing said fetch of said block of data from said memory associated with said address of said new data requested at the end of said line whereby an entire line of data is not read from the memory in order to store the new data in the cache.

10. The method as recited in claim 8, wherein said block of data comprises a line of N data words, wherein said method further comprises the step of:

discontinuing said fetch of said block of data from said memory associated with said address of said data requested at an end of said line when said fetch of said block of data began with an N-Mth word of said line, wherein N and M are positive integers, and wherein M is less than N.

11. A data processing system, comprising:

a processor;

a buffer coupled to said processor, the buffer having a plurality of memory storage locations and at least one validity bit for each line of storage locations, the at least one validity bit having significance for at least one of the plurality of memory storage locations;

a first comparator for comparing an address received from said processor to one or more address tags of a data block residing in said buffer;

a second comparator for comparing said address received from said processor to an address of a data block currently being fetched to said buffer;

circuitry for canceling a current fetch of said data block currently being fetched to a memory storage location in said buffer, the data block having N segments of data and the circuitry negating at least one validity bit which is significant to the memory storage location of the current fetch, wherein said canceling circuitry is responsive to (1) said first comparator determining that said address received from said processor does not match said address of said data block residing in said buffer, and (2) said second comparator determining that said address received from said processor does not match said address of said data block currently being fetched to said buffer; and reading circuitry that reads only a portion of the entire data block containing the new data when the new data resides within an M segment portion of the data block located at the end of the N segments of the data block where M<N, and reading the entire data block containing the new data when the new data resides outside the M segment portion but within the N segments of the data block.

12. The system as recited in claim 11, wherein said buffer is an N-line buffer, wherein said data block currently being fetched to said buffer is a line of data or instruction.

13. The system as recited in claim 12, wherein said cancelling circuitry comprises:
circuitry for notifying said memory to discontinue sending said line of data or instruction.

14. The system as recited in claim 13, further comprising:
circuitry for invalidating portions of said line of data or instruction already fetched to said buffer.

15. The system as recited in claim 13, further comprising:
circuitry for validating portions of said line of data or instruction already fetched to said buffer.

16. The system as recited in claim 11, wherein said buffer is a cache memory.

17. The system as recited on claim 11, wherein the external memory coupled to said buffer by integrated circuit package terminals, wherein said data block currently being fetched to said buffer is being fetched from said memory through the integrated circuit package terminals.

18. The system as recited in claim 11, wherein said buffer and said processor reside on a same integrated circuit, and wherein said external memory is located external to said same integrated circuit.

19. In a data processing system comprising a processor, an N-line buffer coupled to said processor, and an external memory coupled to said N-line buffer, a method comprising the steps of:
receiving a request for a program instruction from said processor, wherein said request includes an address of a line of data words containing said program instruction;
comparing said address of said line of data words containing said program instruction to addresses of N lines residing in said N-line buffer;
comparing said address of said line of data words containing said program instruction to an address of a line currently being fetched from said external memory to said N-line buffer;
determining if said address of said line of data words containing said program instruction matches any of said addresses of N lines residing in said N-line buffer,.
retrieving one of said N lines from said N-line buffer to said processor if said address of said line of data words containing said program instruction matches one of said any of said addresses of N lines residing in said N-line buffer;

if said address of said line of data words containing said program instruction does not match any of said addresses of N lines residing in said N-line buffer, determining if said address of said line of data words containing said program instruction matches said address of said line currently being fetched from said external memory to said N-line buffer and continuing said fetching of said line currently being fetched from said external memory to said N-line buffer if said address of said line of data words containing said program instruction matches said address of said line currently being fetched from said external memory to said N-line buffer;

canceling the fetching of said line currently being fetched from said external memory to said N-line buffer if said address of said line of data words containing said program instruction does not match said address of said line currently being fetched from said external memory to said N-line buffer and does not match the address from which data is currently being fetched; and beginning to read a new line of data words from external memory in response to the step of canceling, the new line of data words containing said program instruction for said processor, said reading of the new line of data words sometimes terminating at an end of the new line of data words regardless of whether all or part of the new line of data words is in the cache and sometimes wrapping around the new line of data words to read all the data words in the line depending upon a control signal within the data processing system.

20. The method as recited in claim 19, further comprising the step of:
discontinuing said fetching of said line of data words containing said program instruction after reading only two longword at the end of said line.

21. The method as recited in claim 19, further comprising the step of:
discontinuing said fetching of said line of data words containing said program instruction at an end of said line when said fetching began with an N-Mth word of said line, wherein N and M are positive integers, and wherein M is less than N.

22. A method for fetching data in a data processing system, the data processing system having a cache, the cache having a plurality of lines each having an identification tag, the method comprising the steps of:
initiating a first fetch of a first data block to the cache, the first data block comprising a plurality of portions;
requesting a first instruction, the first instruction having an associated first address;
comparing the associated first address with each identification tag;
canceling the first fetch of the first data block when the associated first address does not match any of the plurality of identification tags in the cache;
identifying fetched portions of the first data block in the cache as invalid; and
initiating a second fetch of a second data block to the cache according to the associated first address, the second fetch being performed from external memory in one of two manners which is selected by the data processing system based upon a location of the data in the second data block: (1) a first manner requiring that the cache read and store all of the data in the second block of data; and (2) a second manner being where the cache stores only an ending portion of the second block of data wherein the ending portion of the specific line of data starts at the location of the associated first address and terminates at the end of the second block of data wherein the processor sometimes accesses data using (1) and sometimes accesses data using (2).

23. A method as in claim 22, further comprising the steps of:

discontinuing the second fetch at the end of one of the plurality of lines.

24. A method for fetching data in a data processing system, the data processing system having a cache, the cache having a plurality of lines, the method comprising the steps of:

receiving a first request for a first instruction having a first address not available in the cache;

fetching a first portion of data from an external memory, the first portion of data having a first bit length, each of the plurality of lines having a second bit length greater than the first bit length;

storing the first portion of data in the cache;

providing a fetch termination indicator to the external memory after fetching the first portion of the line of data;

receiving a second request for a second instruction having a second address not available in the cache;

initiating a second fetch of a second portion of data from external memory, the second portion of data having a third bit length less than or equal to the second bit length;

receiving a third request for a third instruction having a third address not available in the cache, wherein the third request is received during the second fetch;

canceling the second fetch before fetching all of the second portion of data;

invalidating all of the second portion fetched; and fetching a third portion of data from an external memory, the third portion of data having a bit length equal to the second bit length.

* * * * *